United States Patent [19]

Barker

[11] Patent Number: 5,720,121

[45] Date of Patent: *Feb. 24, 1998

[54] FOOTWEAR WITH ILLUMINATED LINEAR OPTICS

[76] Inventor: Dale E. Barker, 1318 State St., Alton, Ill. 62002

[*] Notice: The term of this patent shall not extend beyond the expiration date of Pat. No. 5,604,999.

[21] Appl. No.: 621,951

[22] Filed: Mar. 25, 1996

Related U.S. Application Data

[60] Continuation-in-part of Ser. No. 525,353, Sep. 8, 1995, Pat. No. 5,604,999, which is a division of Ser. No. 237,790, May 4, 1994, Pat. No. 5,502,903.

[51] Int. Cl.⁶ .................................................. A43B 23/00
[52] U.S. Cl. ......................................... 36/137; 36/136
[58] Field of Search ..................................... 36/137, 136

[56] References Cited

U.S. PATENT DOCUMENTS

| | | |
|---|---|---|
| 352,064 | 11/1886 | Orne . |
| 752,433 | 2/1904 | Bagley . |
| 1,166,495 | 1/1916 | Tizzard . |
| 1,209,059 | 12/1916 | Smith . |
| 2,304,367 | 12/1942 | Meyer et al. . |
| 2,473,877 | 6/1949 | Goldstein . |
| 2,671,847 | 3/1954 | Lerch . |
| 3,067,322 | 12/1962 | Sala . |
| 3,564,232 | 2/1971 | Elberbe . |
| 3,663,796 | 5/1972 | Hines et al. . |
| 3,800,133 | 3/1974 | Duval . |
| 3,893,247 | 7/1975 | Dana, III . |
| 4,020,572 | 5/1977 | Chiaramonte, Jr. . |
| 4,128,861 | 12/1978 | Pelengaris . |
| 4,130,951 | 12/1978 | Powell . |
| 4,158,922 | 6/1979 | Dana, III . |
| 4,234,907 | 11/1980 | Daniel . |
| 4,438,482 | 3/1984 | Leon et al. . |
| 4,441,483 | 4/1984 | Cieslak et al. . |
| 4,471,412 | 9/1984 | Mori . |
| 4,652,981 | 3/1987 | Glynn . |
| 4,704,660 | 11/1987 | Robbins . |
| 4,727,603 | 3/1988 | Howard . |
| 4,848,009 | 7/1989 | Rodgers . |

(List continued on next page.)

FOREIGN PATENT DOCUMENTS

| | | |
|---|---|---|
| 121026 | 10/1984 | European Pat. Off. . |
| 335467 | 10/1989 | European Pat. Off. . |
| 0534560 | 3/1993 | European Pat. Off. . |
| 146353 | 11/1903 | Germany . |
| 405137604 | 6/1993 | Japan . |
| 9311681 | 6/1993 | WIPO . |
| 9415494 | 7/1994 | WIPO . |

*Primary Examiner*—Ted Kavanaugh
*Attorney, Agent, or Firm*—Haverstock, Garrett & Roberts

[57] ABSTRACT

Illuminated footwear having a power source, at least one light source operatively connected to the power source, a switching circuit for selectively illuminating the light source, and a linear side-glow optical conduit located on the footwear so as to be visible when illuminated, the linear optical conduit having opposed end portions and being capable of emitting light conducted therethrough radially outwardly from its circumferential periphery substantially along its entire length, at least one end portion of the linear optical conduit being positioned and located in close proximity to the light source so as to receive light therefrom when illuminated, the linear optical conduit being illuminated substantially along its entire circumferential periphery when the light source is selectively illuminated. In the preferred embodiment, the linear optical conduit extends adjacent a side portion of the footwear, although other arrangements are also possible, and the footwear includes a pocket or cavity in which the power source, light source, associated circuitry, and one end portion of the conduit are located. The pocket cavity is preferably located within a sidewall of the footwear but may be located on the exterior surface thereof, and includes an opening through which the power source can be removed and replaced. All embodiments of the present invention are adaptable for use on and with a wide variety of different types and styles of footwear.

12 Claims, 3 Drawing Sheets

U.S. PATENT DOCUMENTS

| | | |
|---|---|---|
| 4,957,347 | 9/1990 | Zarian . |
| 5,033,212 | 7/1991 | Evanyk . |
| 5,042,892 | 8/1991 | Chiu et al. . |
| 5,051,095 | 9/1991 | Slenker . |
| 5,052,131 | 10/1991 | Rondini . |
| 5,052,778 | 10/1991 | Jamshid . |
| 5,067,831 | 11/1991 | Robbins et al. . |
| 5,086,378 | 2/1992 | Prince . |
| 5,122,580 | 6/1992 | Zarian et al. . |
| 5,149,467 | 9/1992 | Zarian . |
| 5,149,489 | 9/1992 | Crews . |
| 5,221,387 | 6/1993 | Robbins et al. . |
| 5,353,786 | 10/1994 | Wilk . |
| 5,450,293 | 9/1995 | Hoffman . |
| 5,463,537 | 10/1995 | Trattner et al. . |
| 5,502,903 | 4/1996 | Barker . |

FOOTWEAR WITH ILLUMINATED LINEAR OPTICS

This application is a continuation-in-part of co-pending U.S. patent application Ser. No. 08/525,353, filed Sep. 8, 1995 now U.S. Pat. No. 05,604,999, which co-pending application is a divisional of U.S. patent application Ser. No. 08/237,790, filed May 4, 1994, now U.S. Pat. No. 5,502,903.

The present invention relates generally to illuminated footwear and, more particularly, to several embodiments of an illuminated shoe which utilizes one or more linear optical conduits to produce a side-light or side-glow effect which substantially resembles that of neon lighting. The optical transmission properties of the linear optical conduits utilized in the present invention are such that a major portion of any light conducted therethrough will emit sidewardly or radially outwardly from substantially the entire outer circumferential surface of such conduits along their entire length in a substantially uniform manner, and with a greater light intensity than the lights associated with illuminated shoes presently available in the marketplace. Use of the present illumination means on footwear produces substantially the same aura or glow associated with neon lighting and provides a very attractive and decorative shoe which is highly visible at night. All of the various embodiments of the present invention are ideally suited for use with a wide variety of different styles and types of footwear including casual and dress shoes, athletic shoes, ice and roller skates, in-line skates or roller blades, boots, high-top shoes and other similar footwear.

BACKGROUND OF THE INVENTION

As explained in Applicant's co-pending application Ser. No. 08/525,353, many different types of illuminated footwear are well known in the art. Typical of such illuminated shoe constructions are those identified in U.S. Pat. Nos. 5,149,489; 5,052,131; 5,033,212; 4,848,009; 4,158,922; 4,130,951; 4,128,861; 4,020,572; 3,893,247; 3,800,133; and 3,564,232 to name a few. Such known constructions generally use minimized light-emitting diodes or LEDs, miniaturized point lights, or a plurality of bundled light carrying optical fibers capable of emitting light from only the ends thereof which are housed along with appropriate circuitry for energizing the same within the structure of the shoe so as to produce some type of visible illumination from various points on the shoe. Typically, such illumination includes point light illumination spaced at various locations around the sole portion of the particular shoe being illuminated as illustrated in U.S. Pat. Nos. 5,033,212; 4,158,922; 4,130,951 and 5,149,489. Although all of the known footwear illumination means achieve some type of decorative illumination of various portions of the shoe, be it either constant or flashing illumination, none of the known constructions utilize linear optics to achieve a neon look of outstanding brightness, evenness and flexibility as will be hereinafter explained.

The present invention utilizes linear optics in order to achieve its desired illumination effect. Linear light forms have been known for many years and have been utilized in many different types of practical lighting applications such as decorative art forms, pool and spa perimeter and underwater lighting, aisle lighting, and other special effects type illumination. True linear light forms are those in which the source of light is contained within the light form itself such as neon lights, fluorescent lights and other types of tube lighting. Although the present invention strives to achieve a neon type glowing light effect, such simulation is achieved through the use of linear optical conduits wherein the source of illumination is external to the particular optical conduit. In essence, the linear optical conduit functions to conduct and transmit therethrough the light generated by the external source. Optical conduits are commonly referred to as "fiber optics" or "optical fibers". Fiber optics encompass three distinctly different types of functions, namely, telecommunications, coherencies and illumination. Telecommunications fiber optics are used in telephone communications to transmit light from a source to a remote point. Coherent functions involve transmission of a visible image along a bundle of flexible fiber optic conduits to a remote point in such a manner that the placement of the fibers relative to each other at the remote point of site reception is exactly that of the placement of the ends of the fibers relative to each other at the source point of the image of the object which is being transmitted. Both telecommunications and coherent fiber optics are considered point lights and emission of light out of the sides of the optical conduits is to be avoided. Many of the known prior art illuminated shoe constructions utilize some type of fiber optics to achieve point lighting. See, for example, U.S. Pat. No. 4,130,951.

In total contrast, the present invention utilizes a linear optical conduit or other radially emitting light transmissive material wherein the primary function of the linear optical conduit is to provide a means of conducting light from a light source linearly along the length of such optical conduit and thereafter emitting such light from the sides thereof along its total length. The present invention is therefore specifically directed to the use of illuminated linear optics in association with footwear and, more particularly, to the use of linear optical conduits which, when illuminated, produce a side-light effect somewhat similar to that of a neon light along its entire length. These types of linear optical conduits are to be distinguished from telecommunications fiber optics which have been modified by etching or scraping of the outer surface to allow light to escape. Such modified conduits are not capable of producing the neon-like glow of the present invention.

Applicant's co-pending application Ser. No. 08/525,353 discloses several embodiments of an illuminated shoe construction wherein portions of the illumination means are incorporated in the heel of the shoe, such as the shoe 10 illustrated in FIGS. 1 and 2. The shoe 10 includes a linear optical conduit 12 extending around the periphery thereof, the ends of which enter a heel cavity 14. Within the heel cavity 14 are located power supply means 16, a light source 18, connector means 20, a filter member 22, and fastener means 24 for holding the end of the conduit 12 adjacent the light source 18 and filter member 22. The filter member 22 is slidingly engageable with a slot 26 formed in the housing containing the light source 18 so that the filter color can be varied as desired. The rear portion of the shoe 10 also includes an on/off switch 28. Also disclosed in co-pending application Ser. No. 08/525,353 is an embodiment in which the light source and the filter means are removed from the heel cavity and positioned on the rear exterior portion of the shoe.

The present application discloses several additional embodiments of an illuminated shoe construction as described below.

SUMMARY OF THE INVENTION

The present invention teaches the construction and operation of several embodiments of an illuminated shoe or other footwear wherein a linear optical conduit or other linear side-glow type fiber optic material is positioned along the exterior portion of the shoe such that at least one end portion of such material lies adjacent to a light source for illuminating the same. The shoe includes a battery or other electrical power supply means, light means, and a circuit board having all of the appropriate circuitry necessary for illuminating the light means when a particular on/off switch, preferably in the form of a membrane switch, is activated. In the embodiments of the present invention, the power means, the light means, and the circuitry are located within or on a sidewall portion of the shoe. The linear optical conduit can be attached to the exterior portion of the shoe by any suitable means such as by stitching, gluing, clamping, riveting or other attachment means with one end portion thereof entering the sidewall portion of the shoe through a hole in the outer surface thereof so that such one end portion is positioned adjacent the light source. Alternatively, the entire linear optical conduit can be incorporated into a channel formed within the sidewall of the shoe where the exterior surface of the sidewall adjacent the channel is formed of a transparent material.

In the preferred embodiment of the present invention, the linear optical conduit is a single side-glow fiber optic conduit and one end portion of the conduit is located within the sidewall portion of the shoe and is held adjacent the light source. An interior surface of the shoe sidewall includes a closure member which opens to reveal the sidewall portion of the shoe containing the power means so that the power means can be replaced as necessary. The closure member is preferably held closed by Velcro type fastening means so that the power means is normally held securely within the sidewall portion of the shoe. The power means is located on one side of a printed circuit board which faces the interior portion of the shoe while a switch means is located on the opposite side of the circuit board such that the switch faces the exterior portion of the shoe. This arrangement enables the switch to be activated or triggered by exerting or applying a force to the exterior surface of the shoe sidewall adjacent the switch.

Other disclosed embodiments include a shoe in which a flap or closure member is positioned on an exterior surface of the shoe. In this particular construction, it may be desirable to include the membrane switch on the same side of the circuit board as the power means so that both the power means and the membrane switch face the exterior portion of the shoe. Also described herein is a shoe in which an opening is provided along an upper portion of the shoe sidewall so that the power means can be slidably removed and inserted through such opening into a pocket or cavity formed therebelow. Alternatively, another shoe embodiment is described in which a pocket is attached to the exterior surface of the shoe sidewall by gluing, stitching, or other suitable means. This exterior pocket arrangement likewise includes an opening for removing and replacing the power means.

In all embodiments of the present invention, a bundle of smaller diameter side-glow fiber optic conduits as well as a bundle of smaller diameter optical fibers housed within a transparent tubular member may likewise be utilized so long as such optical materials are capable of emitting light from their circumferential periphery. Regardless of the embodiment employed, use of a linear side-light material is paramount to the present invention since such optical materials achieve high intensity light output while offering operational and maintenance cost savings. Also, importantly, since no electricity passes through the linear optical conduit, the present system is extremely safe for use.

It is therefore a principal object of the present invention to provide footwear having improved illumination means associated therewith wherein the illumination means includes the use of linear optical conduits or other linear side-glow type materials which allow light to radiate sidewardly therethrough along their entire length.

Another object is to teach the use of linear optics in shoe illumination means wherein the linear optics utilized has greater light emission from its circumferential periphery for a given light source as compared to known shoe illumination means.

Another object is to provide footwear having illumination means which produce a neon-like glow effect when illuminated.

Another object is to provide footwear utilizing illumination means wherein the side-glow type material can be manipulated to produce various patterns on such footwear.

Another object is to teach the construction and operation of illuminated footwear which utilizes side-glow type fiber optic material wherein the fiber optic material has a relatively uniform light emission distribution from its circumferential periphery even at regions where bends exist.

These and other objects and advantages of the present invention will become apparent to those skilled in the art after considering the following detailed specification in conjunction with the accompanying drawings.

DETAILED DESCRIPTION OF THE INVENTION

Figure 3:
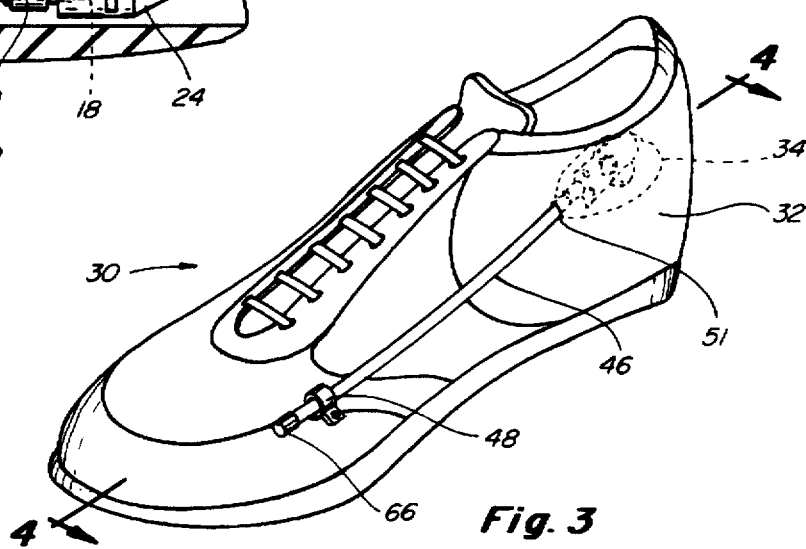
FIG. 3 is a perspective view of one embodiment of a shoe constructed according to the teachings of the present invention.
Figure 5:
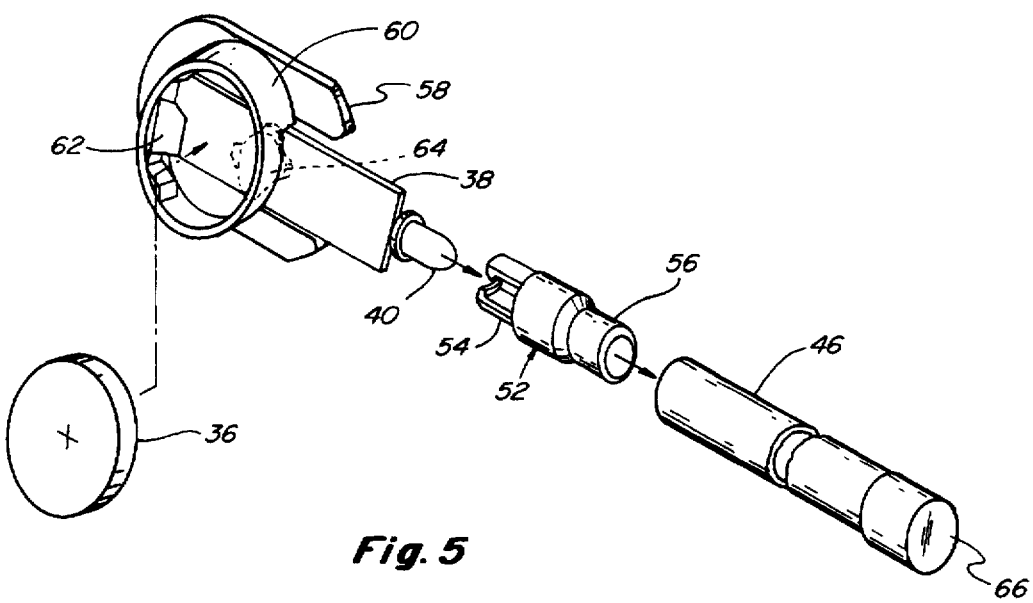
FIG. 5 is an exploded view of the illumination means incorporated within the shoe illustrated in FIGS. 3 and 4.

Referring to the drawings more particularly by reference numerals wherein like numerals refer to like parts, number 30 in FIG. 3 identifies one embodiment of an illuminated shoe constructed according to the teachings of the present invention. The shoe 30 includes a sidewall portion 32 having a pocket or cavity 34 formed between the interior and exterior surfaces thereof. The pocket 34 is sized and dimensioned so as to receive and hold at least one battery or other electrical power means 36, a circuit board 38 and a light source 40 as best shown in FIG. 5. The power supply means 36 may include any plurality of batteries sufficient to power the light source 40 depending upon the size and wattage associated therewith as well as the particular circuitry involved. In this regard, the light source 40 may include one or more LEDs. The circuit board 38 may be of any conventional design and structure depending upon both the size and number of batteries and LEDs associated with the present illumination means. Although the sidewall pocket 34 is shown in FIG. 3 as being located near the top rear portion of the shoe 30, it is recognized and anticipated that the pocket 34, or any other cavity or other suitable holding or containing means, may be located in other portions of the shoe.

Figure 4:
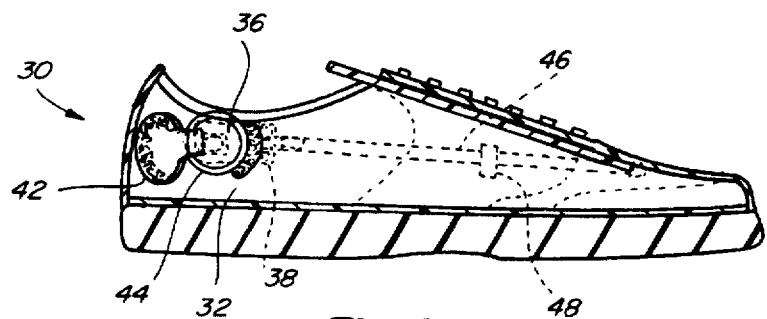
FIG. 4 is cross-sectional view taken along line 4—4 of FIG. 3 showing a closure member located on the interior portion of the shoe sidewall in an open position.

A closure member 42 as best illustrated in FIG. 4 is engageable with an opening 44 located on the interior surface of the shoe sidewall 32, the closure member 42 being pivotally movable between an open and a closed position so as to provide access to the electrical components positioned within the sidewall 32. This also provides an easy mechanism for allowing the power means 36 to be quickly removed and replaced as necessary. The pivotal attachment of the closure member 42 to the interior surface of shoe sidewall 32 is accomplished by permanently affixing a portion of the member 42 to the sidewall 32 as illustrated in FIG. 4, although other pivotal arrangements may likewise be utilized. The peripheral edge portion of the opening 44 and corresponding mating portions of the closure member 42 include cooperatively engageable fastener means such as Velcro type closure material which securely hold the closure member 42 in its closed position against the interior surface of the shoe sidewall 32. Here again, it is recognized that a wide variety of closure means may be utilized to accomplish this task.

Figure 7:
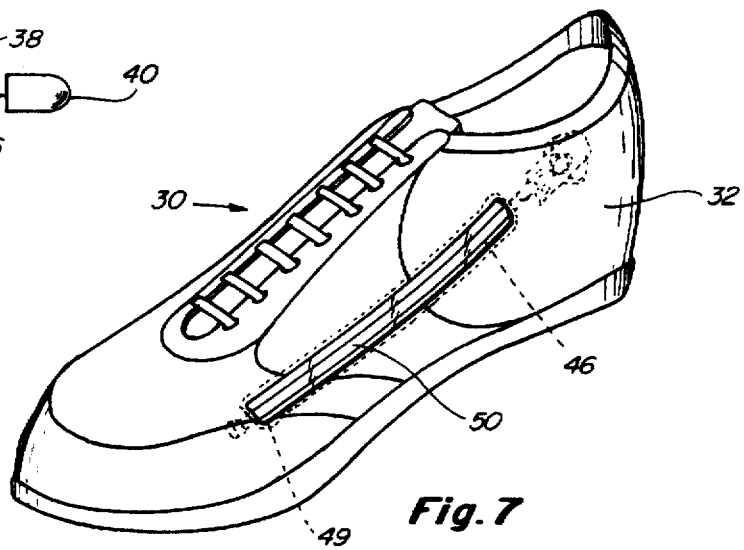
FIG. 7 is a perspective view of another embodiment of the shoe illustrated in FIG. 3 wherein the optical conduit is housed within a channel formed in the sidewall of the shoe.

An important feature of the present invention lies in the use of a linear optical conduit or side-glow type fiber optic material 46 which extends along the exterior portion of the shoe 30 as best illustrated in FIG. 3. The linear optical conduit 46 can be attached to the shoe 30 by any suitable means such as through the use of the fastener means 48 illustrated in FIG. 3. The fasteners 48 can be permanently affixed to the exterior portion of the shoe 30 and are constructed to receive and engage the optical conduit 46 when positioned therewithin. Any plurality of fasteners 48 may be used to securely hold the optical conduit 46 in proper position around the periphery of the shoe as illustrated. It is also recognized that other suitable attachment means may likewise be utilized such as by stitching the optical conduit 46 to the shoe 30; using a plurality of belt-loop type holding means permanently affixed to the shoe through which the optical conduit 46 can be fed; gluing the optical conduit 46 to the exterior portion of the shoe 30; and/or using fasteners as disclosed in Applicant's U.S. Pat. No. 5,502,903. It is further contemplated that the entire conduit 46 can lie and extend within a channel 49 located in the sidewall 32 of the shoe 30 along the length of any portion thereof, in which case the exterior surface of the shoe sidewall 32 located adjacent the conduit such as the exterior surface 50 would be formed of a transparent material so that the light transmitted from the conduit 46 would be visible from the shoe's exterior as best illustrated in FIG. 7.

Referring again to FIG. 3, it can be seen that one end portion of the linear optical conduit 46 is received through an opening 51 located in the shoe sidewall 32 and, as best illustrated in FIG. 5, such conduit end portion is engageable with a suitable connector or fastener means 52 so as to hold the conduit end portion in close proximity to the light source 40. The connector 52 (FIG. 5) includes one end portion 54 configured to receive the light source 40 and one end portion 56 configured to be insertably positioned within the conduit 46. The connector end portion 54 is cylindrical in shape and allows for relative rotational movement between the light source 40 and the connector 52 whereas the connector end portion 56 is insertable into the one end portion of the conduit 46 so as to frictionally hold the same adjacent the light source 40. Other suitable connecting or clamping means may likewise be utilized to hold the one end portion of the optical conduit 46 adjacent the light source 40 including a connector which engages the outer jacket of the conduit 46.

The light source 40 is connected to the circuit board 38 by soldering or other known means and the circuit board is attached to a member 58 configured for receiving the power means 36. In this regard, the power means 36 is fitted within the annular retaining portion 60 of the member 58 which may be constructed of molded plastic or other suitable materials. A clip member 62 formed of a conductive material extends from the circuit board 38 as illustrated and aids in holding the power means 36 within the annular portion 60. Numerous configurations for the members 58 and 62 are possible and it is further recognized and anticipated that the present invention could be constructed without utilizing member 58 so long as the power means 36 can be securely held in its operative position such that it is electrically conductive with the circuit board 38 to provide current to the light source 40.

Figure 6:
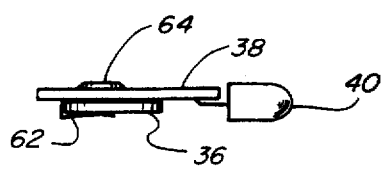
FIG. 6 is a top plan form view of the power means, circuit board, light source, and clip member illustrated in FIGS. 3–5.

FIG. 6 is a top plan form view of the power means 36, circuit board 38, light source 40, and clip member 62 illustrated in FIG. 5. A membrane switch 64 is located on one side of the circuit board 38 while the power means 36 is located on the opposite side thereof. Thus, the switch 64 faces the exterior portion of the shoe 30 illustrated in FIG. 3 so that illumination of the light source 40 can be activated by pressing or otherwise exerting a force against the exterior surface of the shoe sidewall 32 adjacent the switch 64. A wide variety of different types of switches could be incorporated into the present invention to selectively activate the light source 40 including using switches that extend through the shoe sidewall 32.

Although several different types of linear optical conduits can be utilized with the present invention, it is generally preferred that the linear optical conduit 46 be comprised of a clad, optical conduit manufactured and sold by the Lumenyte International Corporation of Costa Mesa, Calif. and sold under the trademark "LUMENYTE"®. The "LUMENYTE"® fiber optic conduit is comprised of a light transmitting core having a relatively high refractive index which is surrounded by a tubular cladding made of a heat shrinkable material having a relatively low refractive index as compared to that of the core, such as a fluoropolymer including "TEFLON"® which provides a snug, uniform cladding around such core. The core may be made of polymeric material as disclosed in U.S. Pat. No. 5,122,580, or it may be made of glass or other known materials used for the manufacture of optical conduits. The "LUMENYTE"® fiber optic conduit includes a relatively thin, minimized, uniform gap between the cladding and the core. The light transmitting core and cladding are housed within a clear, semi-rigid finish jacket, the preferred method for forming the finish jacket around the fluoropolymer cladding being by extruding the finish jacket around the clad, cured light transmitting core using a cross heat extrusion dye. The details associated with "LUMENYTE"® linear optical conduits are set forth in U.S. Pat. No. 5,221,387. This particular material is ideal for use with the present invention since the "LUMENYTE"® optical conduit has improved optical efficiency in that it provides for relatively uniform light emission distribution from its circumferential periphery even at regions where bends exist. This means that the "LUMENYTE"® conduit allows light to radiate outwardly through its sides along its entire length so as to provide a neon-type look of outstanding brightness and uniformity. Also, importantly, use of the "LUMENYTE"® material likewise has an aura or glow analogous to that of neon-type lighting. While the optical conduit illustrated in conjunction with the present invention is a single strand of optical conduit, it is understood that a bundle of smaller diameter optical conduits, or a bundle of smaller diameter optical fibers housed within a transparent tubular housing, capable of emitting light from their circumferential peripheries could also be utilized.

Although clad, optical conduits made by other processes such as those described in U.S. Pat. Nos. 3,641,332 and 5,122,580 may likewise be utilized with the subject invention, such optical conduits are not as optically efficient as the "LUMENYTE"® conduit described above and, in fact, experience scattering problems in that they exhibit numerous bright and dark spots along the length of such conduits especially where bends occur. In this regard, it is important to understand that the coated optical conduits within the field of the present invention must produce linear lighting, that is, such optical conduits must provide a means of conducting light form a light source linearly along the length of the material and must be capable of emitting such light at both the opposite end portion of the conduit from such light source as well its through the circumferential periphery thereof along substantially its entire length. In this regard, the "LUMENYTE"® material is preferred because it provides for a more intense emission of light along its entire length; it allows a greater percentage of the total light conducted therethrough to be emitted from its circumferential periphery than from its non-source end portion; and it emits light relatively uniformly along substantially its entire length, including bends, as compared to other optical conduits which tend to have a higher illumination intensity at the bend portions thereof as compared to along their straight portions. Such other optical conduits include thermoplastic and thermoset optical conduits.

Because of the unique characteristics of the linear side-glow fiber optic material used in the present invention, it is important to position at least one end portion of the optical conduit 46 adjacent the light source 40 so that light may be directed towards and transmitted through such conduit end portion and along the entire length thereof to produce the desired effect as explained above. Illumination of the conduit 46 may also be enhanced by providing a reflective cap 66 on the exposed end of the conduit 46 as shown in FIGS. 3 and 5. Light which travels to the end of the conduit 46 will be reflected back toward the light source 40 thereby increasing the amount of light which escapes from the circumferential periphery of the conduit 46.

Figure 9:
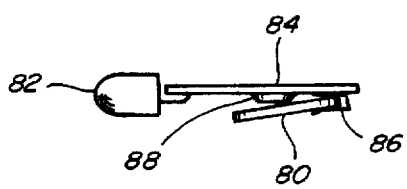
FIG. 9 is a top plan form view of the power means, circuit board, light source, and clip member incorporated into the shoe illustrated in FIG. 8.
Figure 8:
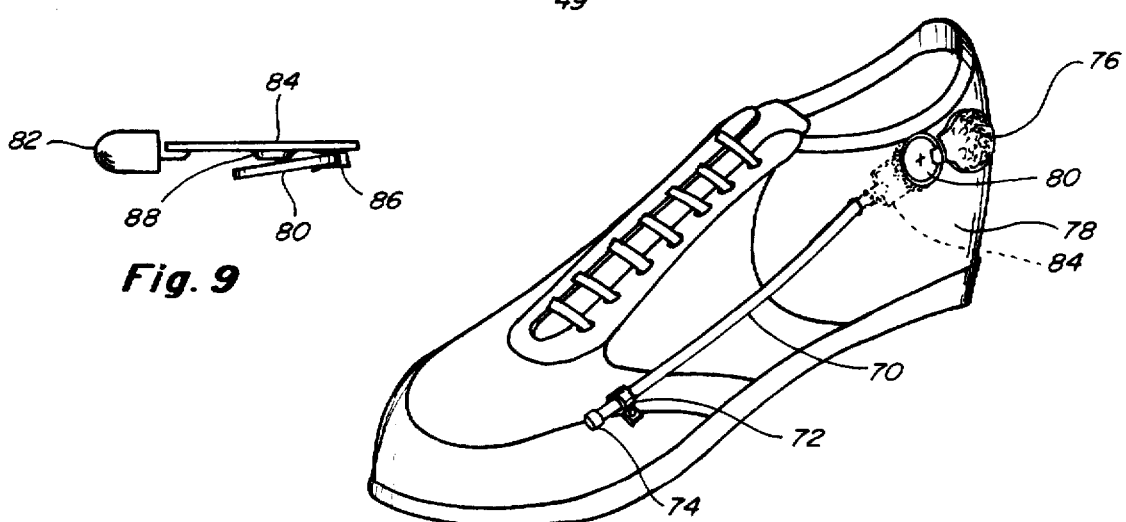
FIG. 8 is a perspective view of another embodiment of a shoe constructed according to the teachings of the present invention wherein the closure member is located on the exterior portion of the shoe sidewall.

FIG. 8 illustrates an alternative embodiment of a shoe 68 constructed in accordance with the teachings of the present invention. The construction of shoe 68 is similar to that of shoe 30 and includes a linear optical conduit 70, fastener means 72, and a reflective cap 74. However, in the embodiment of FIG. 8, a closure member 76 with Velcro type attachment means is located on the exterior surface of shoe sidewall 78 allowing the power means 80 to be replaced while the shoe 68 is being worn. Referring to FIG. 9, which figure represents a top plan form view of the power means 80, the light source 82, the circuit board 84, the clip member 86, and the switch means 88 embodied in the shoe 68 of FIG. 8, a further difference is illustrated wherein the switch 88 is located on the same side of the circuit board 84 as the power means 80. This means that the switch 88 faces the exterior of the shoe 68 and when a force is exerted against the exterior surface of the shoe sidewall 78 in the region of the closure member 76, the power means 80 is pushed against the switch 88 thereby activating the same in order to illuminate the light source 82.

Figure 10:
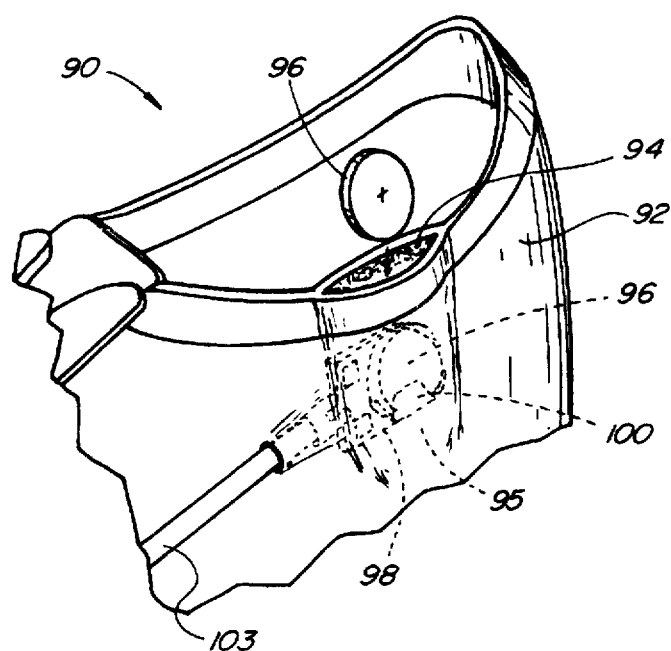
FIG. 10 is a partial perspective view of another embodiment of a shoe constructed according to the teachings of the present invention wherein an opening is provided along the top portion of the shoe sidewall, the opening communicating with a cavity positioned therebelow for housing the electrical components illustrated in FIG. 11.
Figure 11:
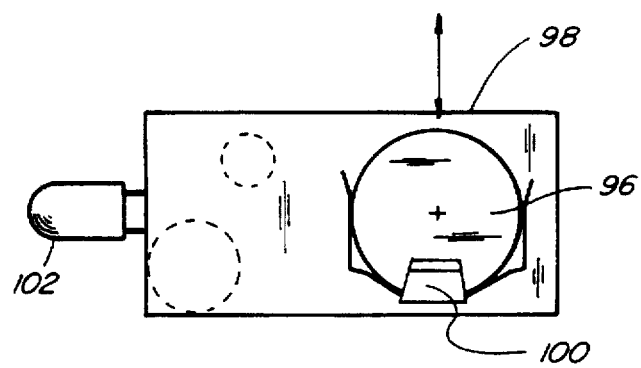
FIG. 11 is a side elevational view of the power means, circuit board, light source, and clip member utilized in the shoe illustrated in FIG. 10.

FIG. 10 is a partial illustration of a still further embodiment of a shoe 90 constructed in accordance with teachings of the present invention. In this particular embodiment, the sidewall 92 of shoe 90 includes a slit or opening 94 along the top edge portion thereof, which opening 94 communicates with a pocket or cavity 95 located therebelow. The peripheral edge portions of the opening 94 include Velcro type attachment means for holding the opening in a closed condition and the cavity 95 is shaped and dimensioned similar to pocket 34 (FIG. 3) so as to receive and hold the electrical components illustrated in FIG. 11. This configuration enables the power means 96 to be slidably positionable within the cavity 95 through the opening 94 for purposes of removably replacing the same when necessary. With respect to the opening 94, it is understood that various means for holding the opening closed could be utilized including snap type fasteners or flexible plastic "ZIP LOCK"® fasteners which, under normal conditions, hold and keep the opening 94 in its closed condition. In order to accommodate replacement of the power means 96, the circuit board 98 as best shown in FIG. 11 includes a clip member 100 positioned along the bottom portion thereof thereby allowing the power means 96 to be easily moved in an up and down direction as illustrated in FIGS. 10 and 11 with respect to the circuit board 98 for both engagement with and disengagement from the clip member 100. In all other respects, the light source 102 is connected to the linear optical conduit 103 in a manner substantially similar to that explained above with respect to embodiment 30 illustrated in FIGS. 3–5. As indicated above with respect to FIGS. 3–6, numerous other configurations for the clip member 100 are likewise possible.

Figure 12:
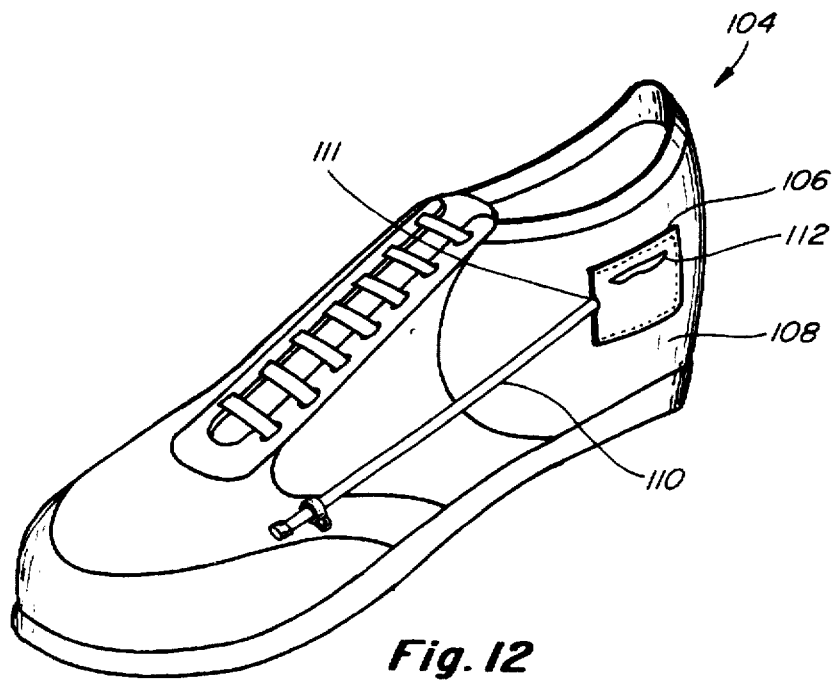
FIG. 12 is a perspective view of still another embodiment of a shoe constructed according to the teachings of the present invention wherein a pocket is attached to the exterior surface of the shoe sidewall.

FIG. 12 illustrates still another embodiment of a shoe 104 constructed in accordance with the teachings of the present invention wherein the shoe 104 includes a pocket 106 positioned on the exterior surface of the shoe sidewall 108. The pocket 106 may be integrally formed with the shoe sidewall 108 or it may be attached to the shoe sidewall 108 by any of a wide variety of various means such as by stitching, gluing, stapling, riveting or using other fastening means for attaching the pocket 106 to the shoe 104. A power means, circuit board, and associated light source similar to the electrical arrangement illustrated in FIG. 11 are located within the pocket 106 and one end of the linear optical conduit 110 enters the pocket 106 as illustrated through an opening 111 and is held adjacent the light source as describe above with respect to the shoe 30 (FIG. 3). The pocket 106 is provided with an elongated opening 112 which allows the power means to be removed and replaced. A variety of different types of openings could be provided and the pocket 106 could also include a closure member such as the member 76 illustrated in FIG. 8.

Figure 1:
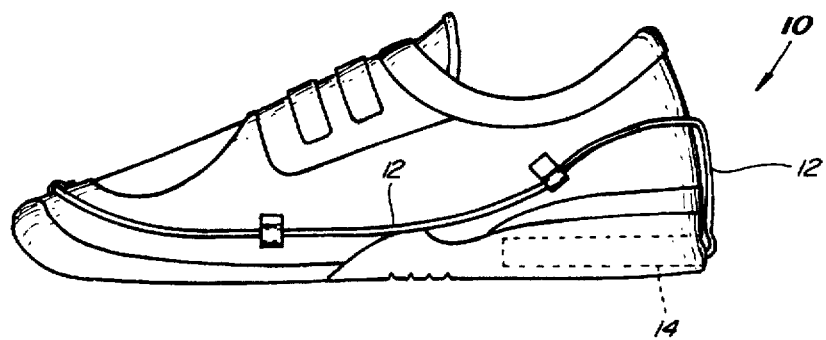
FIG. 1 is a perspective view of a shoe as described in co-pending application Ser. No. 08/525,353.
Figure 2:
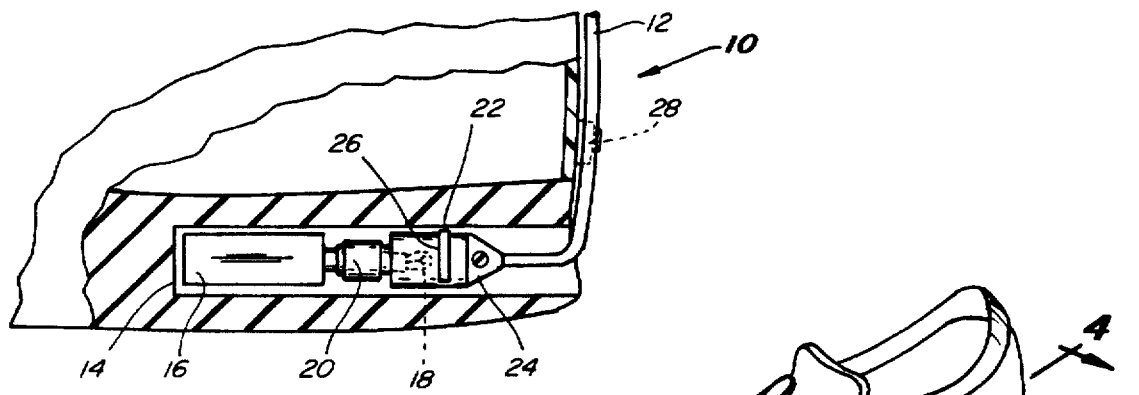
FIG. 2 is a partial, cut-away view of the shoe illustrated in FIG. 1.

The color associated with the linear optical conduit of each of the embodiments described above may be varied by simply using a different color LED for a light source. In those cases where an incandescent bulb is used for the light source, it is also recognized that a color lens or filter means may be positioned between the light source 40 and the conduit end portion positioned adjacent thereto. In this regard, means for holding the filtering means could be included within the sidewall of the shoe, or it could be associated with connector member 52. Such means could take on various forms such as the construction disclosed in Applicant's U.S. Pat. No. 5,502,903 and shown in FIG. 2, which disclosure is incorporated herein by reference. It is also recognized and anticipated that a wide variety of filtering arrangements as well as a wide variety of holding means for maintaining the filter in proper position can likewise be utilized without departing from the spirit and scope of the present invention. Still further, it is anticipated and recognized that the circuit board used in each of the embodiments discussed above may likewise include suitable circuitry to accomplish a wide variety of tasks such as enabling the light source to produce a flashing, blinking or strobing effect. Other circuits and other components can likewise be incorporated into the circuit boards in order to activate the light source in any particular manner to achieve any particular desired effect.

While the various embodiments of the present illuminated shoe illustrated herein include a membrane switch located on one side of a circuit board such that the activation switch faces the exterior of the shoe, it is recognized and contemplated that various switch configurations could be utilized and that such switches could be constructed so as to face the interior of the shoe.

Also, importantly, a unique feature of the linear optical conduit utilized with the present invention, particularly, the "LUMENYTE"® linear side-glow fiber optical material, is its shapeability or sculptability, that is, it can be manipulated to produce various patterns on the shoe. This can be accomplished in most cases by heating the optical conduit such as with a heating blanket to a certain temperature range as specified depending upon the particular optical conduit being utilized, thereafter shaping such conduit into various configurations while heated, and thereafter subsequently allowing such conduit to cool so as to retain the particular patterned shape. This sculptability can be accomplished in any of the different embodiments disclosed herein and may be utilized to extend the optical conduit around any portion of the shoe as desired.

Thus, there has been shown and described several embodiments of footwear utilizing novel illuminated linear optics, which footwear fulfill all of the objects and advantages sought therefor. Many changes, modifications, variations, and other uses and applications of the present constructions will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. An illuminated shoe comprising at least one sidewall having an interior surface and an exterior surface, a light source located within said sidewall, means for supplying power to said light source for illuminating said light source, said power supply means being located within said sidewall, a length of fiber optic conduit running along at least a portion of a length of said shoe so as to be visible when illuminated, said fiber optic conduit having opposed end portions and being capable of emitting light conducted therethrough radially outwardly from substantially its entire outer circumferential periphery, one end portion of said fiber optic conduit being located within said sidewall and positioned adjacent to said light source so as to receive light therefrom when illuminated, said fiber optic conduit being illuminated substantially along its entire outer circumferential periphery when said light source is illuminated, switch means operatively connected to said light source and said power supply means for selectively controlling illumination of said light source, said switch means being located within said sidewall.

2. The illuminated shoe defined in claim 1 wherein said switch means for selectively controlling illumination includes a membrane switch located within said sidewall, said membrane switch selectively controlling illumination of said light source when a force is exerted against the exterior surface of said sidewall.

3. The illuminated shoe defined in claim 1 including an opening located on said sidewall, said power supply means being removable through said opening.

4. The illuminated shoe defined in claim 3 further including a closure member located on said sidewall, said closure member being shaped and dimensioned to cover said opening, and means for holding and securing said closure member to said sidewall in a position to cover said opening.

5. The illuminated shoe defined in claim 3 wherein said opening is located along the top portion of said sidewall, and means for closing said opening such that said power supply means is secured within said sidewall.

6. The illuminated shoe defined in claim 1 wherein the interior surface and the exterior surface of said sidewall define a channel running along a portion of the length of the shoe, said fiber optic conduit being located within said channel, the exterior surface of said sidewall being formed of a transparent material in at least a region adjacent said fiber optic conduit.

7. The illuminated shoe defined in claim 1 wherein said light source includes an LED.

8. An illuminated shoe comprising a pocket located on a side portion of said shoe, a light source located within said pocket, means for supplying power to said light source for illuminating said light source, said power supply means being located within said pocket, a length of fiber optic conduit running along at least a portion of a length of said shoe so as to be visible when illuminated, said fiber optic conduit having opposed end portions and being capable of emitting light conducted therethrough radially outwardly from substantially its entire outer circumferential periphery, one end portion of said fiber optic conduit being located within said pocket and being positioned adjacent to said light source so as to receive light therefrom when illuminated, said fiber optic conduit being illuminated substantially along its entire outer circumferential periphery when said light source is illuminated, switch means operatively connected to said light source and to said power supply means for selectively controlling illumination of said light source, said switch means located within said pocket.

9. The illuminated shoe defined in claim 8 including at least one sidewall having an interior surface and an exterior surface, said pocket being located between said interior and exterior surfaces.

10. The illuminated shoe defined in claim 9 wherein said interior surface and said exterior surface define a channel therebetween, said fiber optic conduit being located within said channel, said exterior surface including a transparent material in at least a region adjacent to said fiber optic conduit.

11. The illuminated shoe defined in claim 8 wherein said shoe includes an exterior surface, said pocket being attached to said exterior surface and having an opening formed therein, said power supply means being removable through said opening.

12. The illuminated shoe defined in claim 8 wherein an opening is formed in said pocket, said power supply means being removable through said opening.

* * * * *